(No Model.)
G. ANDROSS.
Frame for Eyeglasses.
No. 236,751. Patented Jan. 18, 1881.
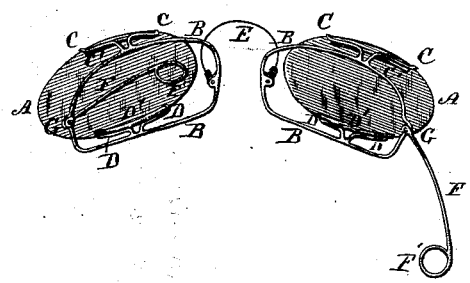
Witnesses
Wendell R. Curtis
Wilmot Horton
Inventor
George Andross
by Theo. G. Ellis, attorney

UNITED STATES PATENT OFFICE.

GEORGE ANDROSS, OF HARTFORD, CONNECTICUT.

FRAME FOR EYEGLASSES.

SPECIFICATION forming part of Letters Patent No. 236,751, dated January 18, 1881.

Application filed September 8, 1880. (No model.)

*To all whom it may concern:*

Be it known that I, GEORGE ANDROSS, of Hartford, in the county of Hartford and State of Connecticut, have invented certain new and useful Improvements in Eyeglass-Frames; and I do hereby declare that the following is a full, clear, and exact description thereof, whereby a person skilled in the art can make and use the same, reference being had to the accompanying drawing, and to the letters of reference marked thereon.

My improvement relates to the frames of eyeglasses which are held in their position before the eyes by means of the tension of a spring; and its object is to do away with the forcible compression of the bridge of the nose which is required with eyeglasses of the ordinary construction, and to hold the lenses with their longest diameters in a horizontal line across the eyes, instead of being inclined at various angles, according to the distance the spring is spread apart, as is ordinarily the case.

In the accompanying drawing, illustrating my invention, A A are the lenses.

B B are the bows. These are made of an oval form, similar to that shown in the drawing, so that they can readily be seen through when placed in front of the eyes.

C and D are branches from the bows, to support the lenses in front of them, the lenses being placed some distance in front of the bows, so that they will be in the proper position when the bows are close to the face and surround the eyes. The branches C and D are each formed of two parts, which are close together where they unite with the bow, but spread apart and form clips to hold the lenses sufficiently separated to hold the edge of the glass firmly, as shown in the drawing. Between the clips I commonly place a strengthening-bar, C′ D′, against which the rear side of the lens rests.

E is a spring, which I ordinarily make of round wire, uniting the bows which hold the lenses. This spring is curved to such a form as to bring the inner sides of the bows in the inner angle of the eye, and is inclined outward, so as to pass over the bridge of the nose. This inclination or angle from the plane of the bows serves the purpose of allowing the bows to reach farther in at the sides of the nose, and also to allow the lenses to turn flatwise at different angles, instead of edgewise, as is commonly the case when the spring is in the plane of the bows.

G G are hinges at the outer sides of the bows B B, upon which the arms F F turn. In the drawing they are shown extended; but they can turn on the hinges to fold up and lie close to the inside of the bows.

F′ F′ are rings turned upon the ends of the arms F. They are for the purpose of resting against the temples to support the eyeglasses in place when in use, and form the chief hold to prevent the frame from falling off. The pressure of the bows around the eyes assists in holding the frame firmly and preventing any side motion. The inner sides of the bows rest against the base of the nose at the inner corners of the eyes, and not over the bridge, as is ordinarily the case, this alone giving a firmer support than the ordinary frame.

My improved frame is folded to place in a case by turning in the arms F and then folding the glasses flatwise, instead of edgewise, as commonly done, the inclined position of the spring E permitting the lenses to move flatwise instead of edgewise.

What I claim as my invention is—

1. The branches C D, formed of two parts, uniting at the bow and spreading to form the clips for the lens, by which the lens is attached to the bow, substantially as described.

2. The bar C′, in combination with the branches C and bow B, substantially as described.

GEORGE ANDROSS.

Witnesses:
THEO. G. ELLIS,
CLARENCE K. WOOSTER.